(No Model.)

C. E. KIMBALL.
ELEVATING MACHINE.

No. 542,975. Patented July 16, 1895.

Witnesses
Harry Winn
Ella Wilson.

Inventor
Chas. E. Kimball

UNITED STATES PATENT OFFICE.

CHARLES E. KIMBALL, OF COUNCIL BLUFFS, IOWA.

ELEVATING-MACHINE.

SPECIFICATION forming part of Letters Patent No. 542,975, dated July 16, 1895.

Application filed March 30, 1895. Serial No. 543,920½. (No model.)

*To all whom it may concern:*

Be it known that I, CHARLES E. KIMBALL, a citizen of the United States, residing in Council Bluffs, in the county of Pottawattamie and State of Iowa, have invented new and useful Improvements in Elevators, of which the following is a specification.

My invention relates to improvements in elevators, in which a chain raises the elevator by passing over a sprocket-wheel. The object of my improvements are, first, to have a chain that will run smoothly over sprocket-wheels and to rise out of the sprockets when the elevator runs to a certain height. I attain this object by the mechanism shown in the following drawings, in which—

Figure 1:
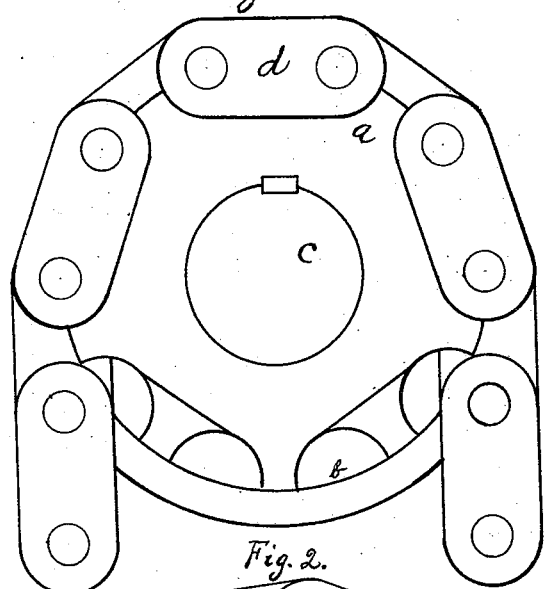
Figure 2:
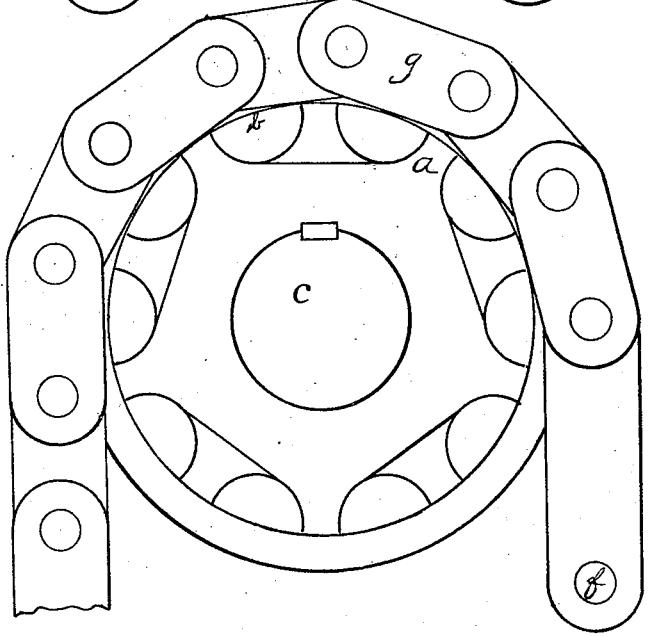
Figure 3:
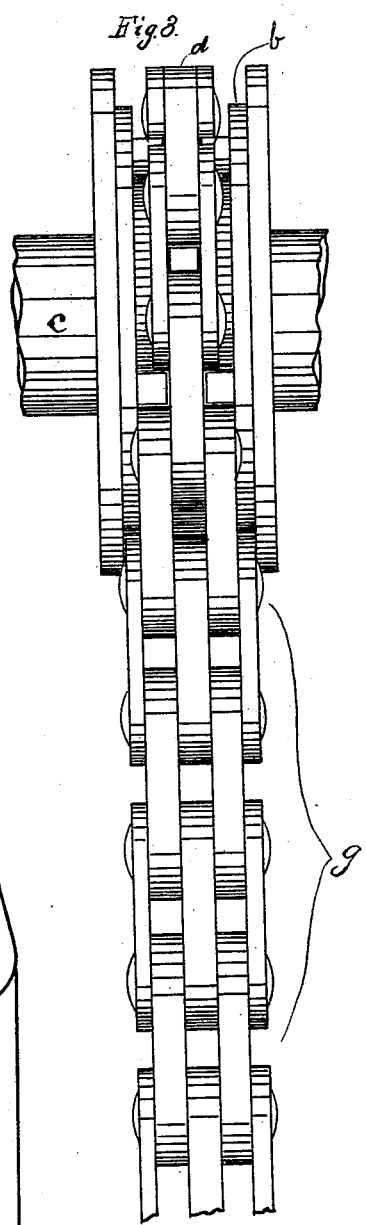

Figure 1 is a vertical sectional view of wheel and chain with chain lying in sprockets. Fig. 2 is a vertical sectional view showing chain raised out of sprockets. Fig. 3 is a front view showing chain engaged in sprockets and also showing enlargement on chain or unevenness in chain.

Similar letters refer to similar parts throughout the several views.

The shaft C, which is supported by boxes, (not shown in views,) has keyed to it the sprocket-wheel A, and the chain D winds over or lies over this sprocket-wheel, and is attached to elevator at F. In Fig. 3 the chain at G is shown to be wider than the chain above, and, therefore, when it runs upon the sprocket-wheel it strikes the collar B and is thereby raised out of the sprockets, therefore letting the wheel turn around free. This chain can be made with wider links or with one or two long links, or any way so that when it runs up over the wheel it will let the wheel slip around without pulling the chain.

What I do claim as my invention, and desire to secure by Letters Patent, is—

1. The combination, with a sprocket-wheel having side flanges thereon extending radially beyond the outer circle of the engaging sprockets, of a chain normally adapted to be engaged by said sprockets and wider than the space between said side flanges in parts of its length, whereby said chain is raised out of engagement with the wheel at those points of its travel comprising said wider parts, substantially as set forth.

2. The combination, with the sprocket wheel having side flanges extending radially beyond the outer circle of the sprockets, of a chain normally adapted to engage the wheel and supplementary links attached to the sides of chain in parts of its length, whereby said parts are made wider than the space between said side flanges, substantially as set forth.

CHAS. E. KIMBALL.

Witnesses:
HARRY WINN,
ELLA WILSON.